United States Patent [19]

Wu

[11] 4,336,355

[45] Jun. 22, 1982

[54] PROCESS FOR GRAFTING LARGE RUBBER PARTICLES AS ABS POLYBLENDS

[75] Inventor: Wan C. Wu, Longmeadow, Mass.

[73] Assignee: Monsanto Company, St. Louis, Mo.

[21] Appl. No.: 198,674

[22] Filed: Oct. 20, 1980

[51] Int. Cl.$^3$ ............................................ C08F 291/02
[52] U.S. Cl. .................................... 525/316; 525/260; 525/263; 525/265
[58] Field of Search ............... 525/316, 260, 263, 265; 260/23 S, 23 EM, 31.8 M, 31.8 DR, 23.7 A

[56] References Cited

U.S. PATENT DOCUMENTS

| | | | |
|---|---|---|---|
| 3,370,105 | 2/1968 | De Bell et al. | 525/316 |
| 3,558,541 | 1/1971 | Dalton | 260/29.7 R |
| 3,663,657 | 5/1972 | Stuart | 525/316 |
| 3,944,630 | 3/1976 | Ide et al. | 525/316 |
| 4,064,116 | 12/1977 | Papetti | 525/316 |
| 4,112,021 | 9/1978 | Shima et al. | 525/316 |
| 4,157,361 | 6/1979 | Connell | 525/316 |

*Primary Examiner*—William F. Hamrock
*Attorney, Agent, or Firm*—David Bennett; William J. Farrington; Paul D. Matukaitis

[57] ABSTRACT

The invention relates to a process for preparing ABS polyblends by grafting large diene rubber particles in aqueous latices in the presence of oligomeric surfactants providing large grafted diene rubber particles in latices that are stable and essentially free of coagulum. The ABS polyblends recovered from such latices are free of hard spots and have superior toughness.

18 Claims, No Drawings

PROCESS FOR GRAFTING LARGE RUBBER PARTICLES AS ABS POLYBLENDS

BACKGROUND OF THE INVENTION

As is well known, graft polyblends of rubbers with various vinylidene polymers have advantages in providing compositions of desirable toughness, chemical resistance and good formability. ABS polyblends have proved particularly advantageous in many applications, and modifications of such ABS polyblends include the substitution of alkyl acrylate esters for a portion of the vinylidene monomer components, variations of the ratio of styrene-type and acrylonitrile-type monomers and the use of saturated rubbers such as acrylate rubbers as the substrate for the graft.

In U.S. Pat. No. 3,509,238 granted Apr. 28, 1970 to Aubrey and Jastrzebski, there is disclosed and claimed an ABS-type polyblend containing graft copolymers having distinct degrees of grafting to provide a highly desirable balance of properties, the lowly grafted polymer apparently tending to cluster and simulate a larger particle size graft copolymer to provide a very high degree of impact resistance. In U.S. Pat. No. 3,509,237 granted to Norman E. Aubrey on Apr. 28, 1970, there is disclosed and claimed an ABS-type polyblend wherein there are graft copolymer particles of relatively small size and graft copolymer particles of relatively large size.

The concepts of the aforementioned applications have been widely employed in commercial compositions. In the use of the concept of the latter of the above mentioned applications, the large particle component has been provided by a mass/suspension polymerization process and the smaller particle component has been provided by an emulsion polymerization process. There has been a desire to prepare both components in a single reaction by the same polymerization process in an effort to minimize cost. In such efforts utilizing an emulsion process, there has been encountered considerable difficulty because of the tendency of agglomerated latices to be unstable during the grafting reaction and also because of the desirability of controlling the amount of grafting upon the rubber components of different particle size.

It is the object of the present invention to prepare ABS polyblends having grafted large agglomerated rubber particles only that are free of hard spots and have superior toughness for pipe and molding applications.

It is a further objective of this invention to provide a process that will prepare such ABS polyblends having larger rubber particles by emulsion polymerization only.

U.S. Pat. No. 3,663,656 relates to a process for grafting large agglomerated rubber particles in latices but requires that small rubber particles must be grafted first to stabilize such latices before the large agglomerated rubber particles are added to the latex and grafted. This process requires two steps to graft larger particles increasing costs by the use of large amounts of small rubber particles and the additional steps involved. An all emulsion process was needed to produce ABS polyblends having only large grafted rubber particles in the range of 0.30 to 1.0 microns.

It has now been discovered that agglomeration larger rubber particles that provide greater toughness in ABS polyblends, can be grafted in latices that have been stabilized with oligomeric surfactants.

SUMMARY OF THE INVENTION

Present invention relates to:
1. A process for preparing ABS polyblends by grafting large diene rubber particles with alkenyl nitrile monomers comprising:
   A. Charging an aqueous latex containing diene rubber solids to a mixing zone, said rubber being dispersed in said latex by an anionic surfactant as particles having an average particle size diameter of about 0.05 to 0.20 microns,
   B. mixing a water soluble organic acid anhydride having an ionization constant higher than that of the acid member of the anionic surfactant in said aqueous latex,
   C. agglomerating said rubber particles, contained in said latex, to larger agglomerated particles having an average particle size of about 0.30 to 1.0 microns,
   D. stabilizing said larger agglomerated rubber particles in said latex by the addition of a sufficient amount of an oligomeric surfactant to said latex to stabilize said latex,
   E. polymerizing a mixture of alkenyl aromatic and alkenyl nitrile monomers in the presence of said stabilized latex so as to form a matrix phase polymer of said monomers and graft said agglomerated rubber particles with at least a portion of said monomers, providing a latex containing said grafted rubber particles and said matrix polymer essentially free of coagulum,
   F. separating said matrix polymers having said grafted diene rubber particle dispersed therein from said latex as an ABS polyblend.

PREFERRED EMBODIMENTS

The Rubber Substrate

Various rubbers onto which the vinylidene may be grafted during the polymerization in the presence thereof are utilizable as the substrate of the graft copolymers including conjugated 1,3-diene rubbers, ethylene-propylene-diene terpolymer rubbers, acrylate-diene interpolymer rubbers, and mixtures thereof. Although saturated rubbers may be grafted, it has been found desirable to include at least a small amount (at least 1.0 percent by weight) of a diene monomer component such as butadiene-1,3 in order to facilitate grafting thereof. This diene monomer component will normally comprise 1 to 20 percent by weight and preferably 2 to 8 percent by weight of the ethylene/propylene/diene terpolymer or acrylate copolymer rubber.

The preferred rubbers are diene rubbers or mixtures of diene rubbers, i.e., any rubbery polymers (a polymer having a second order transition temperature not higher than $-20°$ centigrate, as determined by ASTM Test D-746-52T) of one or more conjugated 1,3-dienes, e.g., butadiene, isoprene, piperylene, chloroprene, etc. Such rubbers include homopolymers of conjugated 1,3-dienes and interpolymers of such 1,3-dienes with up to an equal amount by weight of one or more copolymerizable monoethylenically unsaturated monomers, such as monovinylidene aromatic hydrocarbons (e.g., styrene; an aralkylstyrene, such as the o-, m-, and p-methylstyrenes, 2,4-dimethylstyrene, the ar-ethylstyrenes, p-tert-butylstyrene, etc.; and alphaalkylstyrene, such as alpha-methylstyrene, alpha-ethylstyrene, alpha-methyl-n-methylstyrene, etc.; vinyl naphthalene, etc.); ar-halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.e., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl the vinylidene chlorides and bromides, etc.); and the like.

Although the rubber may contain up to about 2 percent of a cross-linking agent, based on the weight of the rubber-forming monomer or monomers, excessive crosslinking can result in loss of the rubbery characteristics. However, cross-linking of the rubber graft is desirable to preserve proper morphology of the particles thus produced. Accordingly, some cross-linking during the grafting reaction is advantageous and inherent cross-linking can be further encouraged through the variation of graft polymerization conditions as is well known in the art. Thus, rubber graft particles of spherical form and proper size may be obtained and maintained even during mechanical processing to achieve the desired dispersion thereof in the rigid matrix when such a technique is employed. The cross-linking agent can be any of the agents conventionally employed for cross-linking diene rubbers, e.g., divinylbenzene, diallyl maleate, diallyl fumarate, diallyl adipate, allyl acrylate, allylmethacrylate, diacrylates and dimethacrylates of polyhydric alcohols, e.g., ethylene glycol dimethacrylate, etc.

A preferred group of rubbers are those consisting essentially of 75 to 100 percent by weight of butadiene and/or isoprene and up to 25 percent by weight of a monomer selected from the group consisting of monovinylidenearomatic hydrocarbons (e.g., styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene.

Polymerizable Vinylidene Monomer Formulations

The polymerizable monomer formulation will, of course, contain the monomers to be polymerized, initiator where required, and other desirable components such as stabilizers, molecular weight regulators, etc.

The specific monomers will, of course, very with the desired product. However, the process is highly advantageously employed in the manufacture of styrene-type polyblends, i.e., polymerizable monomer formulations containing monovinylidene aromatic hydrocarbons either alone or in combination with other copolymerizable monomers such as unsaturated nitriles. Where a styrene-type monomer is employed solely, then the resultant product will be of the type known as an "impact styrene." Where styrene and acrylonitrile-type monomers are employed jointly in the polymerizable formulation, the resulting product will be of the type known as "ABS." However, it should be understood that the composition of the polymerizable formulation may vary widely.

Exemplary of the monovinylidene aromatic monomers (alkenyl aromatic) that may be homopolymerized or interpolymerized are styrene; alpha-alkyl monovinylidene monoaromatic compounds, e.g., alpha-methylstyrene, alpha-ethylstyrene, alpha-methylvinyltoluene, alpha-methyl dialkylstyrene, etc.; ring-substituted alkyl styrene, e.g., vinyl toluene, o-ethylstyrene, p-ethylstyrene, 2,4-dimethylstyrene, etc.; ring-substituted halostyrenees, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylsturene, etc.; vinyl naphthalene; vinyl anthracene, etc. The alkyl substituents generally have one to four carbon atoms and may include isopropyl and isobutyl groups. If so desired, mixtures of such monovinylidene aromatic monomers may be employed.

Exemplary or other vinylidene monomers that may be employed solely or interpolymerized with monovinylidene aromatic monomers are ethylenically unsaturated nitriles (alkenyl nitrile), such as acrylonitrile, methacrylonitrile, ethacrylonitrile and mixtures thereof; conjugated 1,3-dienes, e.g., butadiene, isoprene, etc.; alpha- or beta-unsaturated monobasic acids and derivatives thereof, e.g., acrylic acid, methyl acrylate, ethyl acrylate, butyl acrylate, 2-ethylhexyl acrylate, methacrylic acid and the corresponding esters thereof, acrylamide, methacrylamide; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of various of the foregoing materials useful as comonomers in an interpolymer will vary.

The preferred vinylidene monomer fomulations of the present invention consist at least principally of a monovinylidene aromatic hydrocarbon and an ethylenically unsaturated nitrile, i.e., such monomers comprise as least 50.0 percent by weight and preferably at least 75.0 percent by weight and preferably at least 75.0 percent by weight of the formulation. Most desirably, such monomers comprise at least 90.0 percent by weight of the formulation and the usual commercial compositions are substantially completely comprised of such monomers although minor amounts, i.e., less than 5.0 percent by weight of other components such as chain transfer agents, modifiers, etc., may be included.

These preferred polymerizable monomer mixtures contain at least 10 percent by weight of the monovinylidene aromatic hydrocarbon monomer and preferably at least 50 percent by weight thereof. They also contain at least 5 percent by weight of the unsaturated nitrile and preferably at least 10 percent by weight thereof. From the standpoint of highly advantageous commercial practice, to produce advantageous ABS products, the monomer formulations contain 20 to 95 percent, and preferably 60 to 85 percent, by weight of the monovinylidene aromatic hydrocrabon and 80 to 5 percent, and preferably 40 to 15 percent, by weight of the unsaturated nitrile.

Agglomeration of the Rubber Latex

As has been indicated, a latex having a particle size of less than 0.25 micron is agglomerated to provide a particle size of 0.30 to 1.0 microns (weight average). Various techniques have been proposed and utilized for the agglomeration of rubber latices including freeze-thaw, acidulation, and shear or pressure agglomeration (the last technique being the subject of British Pat. Nos. 976,212, 976,213, and 976,214).

The preferred process of agglomeration utilizes a highly advantageous acidulation technique which is the subject of copending U.S. application Ser. No. 677,078 filed Oct. 23, 1967 by William O. Dalton, now U.S. Pat. No. 3,558,541, granted Jan. 26, 1971. In this process, an organic acid anhydride is added to a rubber latex and dispersed therein before substantial hydrolysis of the anhydride occurs. The latex uses as the emulsifier a soap or salt of an organic acid having an ionization constant lower than that of the acid of the anhydride. The mixture is then allowed to stand with minimal agitation until the anhydride hydrolizes to provide free acid which attacks the emulsifying agent and causes agglomeration of the rubbery particles. Substantial agitation during this portion of the process if avoided to prevent coagulation. After the desired particle size has been obtained, the latex is stabilized by the addition of an oligomeric surfactant emulsifying agent.

The acid anhydride preferably employed is acetic acid anhydride although maleic acid anhydride and propionic acid anhydride have also been employed advantageously. Generally, the amount of anhydride employed will be at least one-tenth the stoichiometic equivalent of the emulsifying agent (a molar ratio of 1:20 since there are two acid radicals). Normally, the amount employed is at least one-fourth the stoichiometric equivalent and preferably the amount added is in excess of the stoichiometric amount of the emulsifying agent. However, amounts in excess of five times the equivalent provide no additional benefit and may interfere with the stability of the agglomerated latex or with the properties of the polymer by introducing excessive acidity or corrosive action.

The time for agglomeration will vary with temperature, the amount of anhydride and emulsifying agent, the rate of hydrolysis of the anhydride, the nature of the rubbery polymer, the initial and desired sizes of the particles, etc. Periods of five minutes to ten hours may be employed, with normal times of about five minutes to two hours being employed at ambient temperatures.

After the agglomeration reaction has taken place, the latex can be stabilized by the addition of an acid stable emulsifier or by the regeneration of the initial soap emulsifier by the addition of a basic compound to neutralize the acid. Anionic emulsifying agents such as alkali metal salts of long chain sulfonic acids have been employed successfully. An alkali metal hydroxide or other basic compound such as carbonate may be added to regenerate the fatty acid soap; the amount added will normally be the stoichiometric equivalent of the acid anhydride although lesser amounts may be employed with some lessening in stability of the latex.

Although additional anionic surfactants or regenerating of the original surfactant hydrolized by the agglomerating agent, acetic anhydride, as described above is possible, the stability of the large rubber particles in the latex during grafting was not sufficient to prevent losses by coagulation.

It was discovered that the oligomeric surfactants have a higher surface tension and can stabilize the larger agglomerated particles in the emulsion with essentially no coagulation losses during graft polymerization. The oligomeric surfactants can be used in combination with anionic surfactants having an anionic oligomeric polymeric hydrophilic group.

Anionic surfactants are offered here as those alkali metal salts of fatty acids (oleic, stearic, palmitic, e.g.), alkyl or alkaryl sulfates, sulforates, phosphates or mixtures thereof.

Anionic surfactants available commercially usually have a hydrophilic moiety which is negatively charged in aqueous solutions or dispersions. Such products have either a carboxylate, sulfonate, sulfate or phosphate group. The anionic soaps have the general formula and composition $(RCOO)\text{-}(M)+$ where R is an alkyl group, usually in the $C_8$ to $C_{21}$ range and M is a metallic or amine ion. The sulfonates have the general formula $(RSO_3)\text{-}(M)+$ wherein R can be an alkyl or alkarylene group. The sulfates or surfated products have the hydrophilic group $-OSO_3-$ of the half ester sulfate ester surfactant is $-SO_3$ attached through an oxygen atom to a carbon atom of the hydrophobic moiety. The phosphate esters include alkyl ortho-phosphates and alkyl polyphosphates. Commercially available anionic surfactants are listed on the Kirk Othmer Encyclopedia of Chemical Technology, Volume 19, Second Edition Interscience Publishers of John Wiley and Sons, N.Y., pages 512–531 (1969).

Oligomeric surfactants are defined as alkali metal salts of oligomeric anionic polymers. The oligomeric anionic polymers are comprised of monomers selected from the group consisting of acrylic acid, methacrylic acid, ethacrylic acid, maleic anhydride, etc. having carboxyl groups, and copolymers of said monomers with comonomers selected from the group consisting of alkenyl aromatic, e.g. styrene, alkenyl nitrile, e.g. verylonitrile, acrylamide, vinyl esters, vinyl esters, etc. or mixtures thereof.

The anionic oligomeric polymers are low molecular weight polymers having water solubility and a degree of polymerization of about 5 to 200 monomer units per molecule with about 5 to 100% of the monomer units having carboxyl groups.

The oligomeric surfactant is used in an amount sufficient to stabilize the large agglomerated particles in the latex. If the anionic surfactant has been only partially neutralized by the acid anhydride stoichrometrically then lesser amounts of the oligomeric surfactant is needed to bring the latex back to a stable colloidal state and vice versa if most or all of the anionic surfactant has been neutralized then larger amounts of the oligomeric surfactant will be needed and becomes the primary emulsifier.

The larger the agglomerated particle the larger the amount oligomeric surfactant needed to keep such particles colloidally dispersed in the latex and also emulsify and distribute the grafting monomers used during polymerization. The latex should be adjusted to a pH of 6.5 to 8.0, preferably 7.0 to 7.5 to provide the most stable emulsion systems for grafting.

Generally, the emulsifying oligomeric surfactant should be present in an amount of about 0.05 to 15 parts, preferably 0.1 to 5 parts, per 100 parts of rubber solids and monomer or final solids, rubber and polymer, after polymerization.

The rubber latices are diluted with water to accommodate the additional monomers and polymer solids to be formed in amount of about 1 to 4 parts of water per part of monomers. The pH can be adjusted with alkaline metal hydroxides and salts, e.g. bicarbonates, e.g. to buffer the pH.

If the monomers are added incrementally during grafting they should be added in a water-oligomeric surfactant solution to insure latex stability as conversion of monomers to polymers approaches 100%.

Graft Polymerization

The graft copolymer is prepared by polymerizing the monomer formulation in the presence of the preformed rubber substrate, generally in accordance with conventional graft polymerization techniques. In such graft polymerization, the preformed rubbery polymer substrate generally is dispersed with the monomer in the latex and this admixture is polymerized to combine chemically or graft at least a portion of the polymer upon the rubber substrate. Depending upon the ratio of monomers to rubbery substrate and polymerization conditions, it is possible to produce both the desired degree of grafting of the polymer onto the rubbery substrate and the polymerization of ungrafted polymer to provide the desired amount of matrix polymer at the same time. Normally, the ratio of monomers to rubber charged to the graft polymerization reaction is the primary determinant of the superstrate:substrate ratio of the resultant graft copolymer. However, conditions of polymerization, rubber chemistry and particle size, rates of monomer addition, chain transfer agents, etc., also exert an effect.

The initiator or catalyst is generally included within the range of 0.001 to 1.0 percent by weight, and preferably on the order of 0.005 to 0.5 percent by weight of the polymerizable monomer, depending upon the monomers and the desired polymerization cycle. The initiator may be added incrementally to facilitate optimum grafting. As is well known, it is often desirable to incorporate molecular weight regulators such as mercaptans, halides and terpenes in relatively small percentages by weight, on the order of 0.001 to 2.5 percent by weight of the polymerizable monomer. In addition, it may be desirable to include relatively small amounts of antioxidants or stabilizers such as the conventional alkylated phenols, although these may be added during or after polymerization.

Various water-soluble free radical polymerization initiators are conventionally used for emulsion polymerization of the rubber monomers including conventional peroxy and azo catalysts, and the resultant latex containing residual initiator may be used as the aqueous medium with which the polymerizable monomers are mixed. Usually additional initiator will be added for graft polymerization. Exemplary of peroxy catalysts are the alkali metal peroxides, persulfates, perborates, peracetates and percarbonates, and hydrogen peroxide. If so desired, the initiator may be activated to form a redox system. In addition, it may be advantageous to include an oil-soluble initiator such as di-tert-butyl peroxide, benzoil peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide, isopropyl peroxy dicarbonate, 2,5-dimethyl-2,5-di-(tert-butylperoxy)-hexane, 2,5-dimenthyl-2,5-di(tert-butylperoxy)hexane-3, tert-butyl hydroperoxide, cumene hydroperoxide, p-methane hydroperoxide, cyclopentane hydroperoxide, diisopropylbenzene hydroperoxide, p-tert-butyl-cumene hydroperoxide, pinane hydroperoxide, 2,5-dimenthylhexane-2,5-dihydroperoxide, etc., and mixtures thereof. However, other free-radical generating catalysts may be employed such as actinic radiation.

The latex of the rubbery polymer and the monomer formulation is polymerized in an inert atmosphere at temperatures in the range of 20°–100° centigrade with agitation. Pressures of 1–100 lbs. per square inch may be employed. Although the entire amount of the monomer formulation may be present at the time that polymerization is commenced, generally it is preferable to add the monomer formulation either continuously or in increments over the major portion of the polymerization cycle with at least some of the monomer formulation being added after the agglomerated or large particle rubber latex has been introduced into the polymerizing mixture. Normally, additional initiator is added incrementally or continuously over the portion of the portion of the cycle during which the monomer formulation is being added. Polymerization is continued until substantially all, i.e., more than 90 percent, of the monomers have been polymerized. The remaining monomer formulation or other volatile components are then distilled from the latex which is dewatered, washed and dried. The latex may be dewatered by spray drying, by coagulation through the addition of salts, etc.

The total amount of monomer formulation to be added will normally amount to 70–250 parts monomer per 100 parts total rubbery polymer and preferably about 100–200 parts per 100 parts total rubbery polymer. The actual amount of monomer formulation added will vary dependent upon the grafting efficiency of the reaction and the desired superstrate to substrate ratio for the graft copolymers formed by the different particle size rubbers.

The polymerization cycle will normally range from 2–10 hours and preferably 4–6 hours. In accordance with the preferred procedure, the monomer formulation is added over approximately $2/6-\frac{5}{8}$ of the total polymerization cycle. Although this addition may take the form of increments of varying size, the preferred technique utilizes substantially continuous addition at a relatively constant rate over $178 - \frac{3}{4}$ of the cycle.

Effect of Particle Size on Graft Ratio

Generally, the particle size of the rubbery polymer has an effect upon the optimum grafting level for the large particle graft copolymer and to a lesser extent on the optimum grafting level for the small graft copolymer. As will be readily appreciated, a given weight percentage of smaller size rubber particles will provide considerably greater surface area for grafting than the equivalent weight of a larger size rubber particle. Accordingly, the density of grafting produced by a given weight of graft superstrate will vary depending upon the size of the rubber particle. An excessive graft level is to be avoided with respect to the large particle rubber since it will adversely affect its contribution to impact resistance.

Normally, the small particle rubber is relatively highly grafted with the conditions being selected so as to produce a superstrate to substrate ratio of 45–200:100 and preferably 50–70:100, depending upon the particle size. The large particle rubber is relatively lightly grafted with the polymerization conditions and the time of addition being selected to produce a superstrate to substrate ratio of about 10–40:100 and preferably 20–35:100.

The Polymer Blend

As will be readily appreciated, the rubber content of the polymer blend produced by the graft polymerization process of the present invention may be in excess of that desired for the final product since economics generally dictate the use of high rubber levels in the graft polymerization reaction. Accordingly, the graft polymerization blend resulting from the graft polymerization reaction will normally be blended with a vinylidene polymer of similar composition to increase the amount of matrix polymer and reduce the rubber level. This resinous polymer used for dilution of the graft copolymer may be produced by an emulsion process so that the latex thereof may be combined with the latex from the graft polymerization process and the mixed latex coagulated. Alternatively, the recovered graft copolymer may be admixed with a separately formed resinous polymer produced by emulsion, suspension or mass polymerization techniques.

Generally, the final polymer blends will contain 2-50 percent by weight of the total of the rubber components. Increasing the total amount of rubber graft in the composition generally increases the Izod impact strength of the composition but rapidly increases the viscosity of the blend and decreases the tensile strength at yield and fail and the tensile modulus. Accordingly, the preferred blends contain about 7-35 percent by weight of the graft copolymers based upon rubber and most desirably about 13-25 percent by weight thereof.

Exemplary of the efficacy of the present invention are the following specific examples wherein all parts are parts by weight unless otherwise indicated.

EXAMPLE ONE

Acetic Anhydride Agglomeration Formulation

|   | pph solids |
|---|---|
| A. 43%, 0.13μ polybutadiene latex (3) | 233.0 |
| B. Acetic anhydride | 1.65 |
| C. Distilled water | 59.0 |
| D. 49% Dowfax (2A1 (1) | 1.0 |
| E. 46% Polywet KX-4 (2) | 2.04 |
| F. Potassium hydroxide | 1.23 |
| G. Potassium bicarbonate | 0.56 |
| H. Distilled water | 13.0 |

(1) Dowfax 2A1 - Sodium salt of a long chain sulfonic acid available from the Dow Chemical Co., Midland, Michigan (anionic surfactant).
(2) Polywet KX-4 - Potassium salt of a poly-functional polymeric oligomer having molecular weight of 1500 based on acrylic acid polymer (oligomeric surfactant). Available from Uniroyal Inc., Naugatuck, Connecticut under the tradename Polywet KX-4.
(3) Solids - 100 parts polybutadiene.

Ingredient B was mixed in C and the mixture was immediately added to A with vigorous agitation using glass stirrer for 10 seconds. After 25 minutes, the latex was post-stabilized by adding a well-mixed solution of ingredients D, E, F, G and H. The agglomerated latex was then styrene-acrylonitrile grafted.

Styrene-Acrylonitrile Grafting Formulation

|   | pph solids |
|---|---|
| A. Agglomerated 33.8%, 0.55μ polybutadiene latex | 296 |
| B. Styrene/Acrylonitrile | 22.3/5.62 |
| C. 4% potassium persulfate | 8.14 |
| D. 2% sodium bisulfite | 8.14 |

Ingredient A was charged into a glass reactor, purged with N₂ and heated with agitation to 60° C. Half the styrene monomer (75.5 g) in ingredient B was slugged into the reactor. After one hour, the reactor temperature was raised to 80° C. and ingredient C was slugged into the reactor while the rest of the styrene/acrylonitrile monomer was metered into the reactor over a period of three hours. Half an hour after the completion of monomer addition, ingredient D was metered into the reactor over a period of half an hour. The reactor kettle was cooled with wet ice and dumped right after the completion of sodium bisulfite addition. The agitation speed was ~350 RPM throughout the reaction.

The following table summarizes the styrene/acrylonitrile grafting conditions and results using Polywet KX-4/Dowfax 2A1 as compared with that using Dowfax 2A1 only.

| Soaps (pph S) | Aggol. Part. Size,μ | pH | Agitator Speed RPM | Latex Solid % | Coag. & Wall Scale pph solid |
|---|---|---|---|---|---|
| Polywet KX-4 (1) Dowfax 2A1 (0.5) | 0.55 | 7.0 | 350 | 38 | None |
| Dowfax 2A1 (2) | 0.55 | 4.5 | 200 | 25 | 2-3 |

It is evident that the anionic surfactant above causes considerable coagulum and/or wall scale whereas the presence of the oligomeric surfactant essentially or totally inhibits the formation of coagulum and allows the grafting of large rubber particles to form a stable latex.

EXAMPLE TWO

Example One was repeated using 3.0 pph of the oligomeric surfactant Polywet KX-4 as Item (E) and deleting the Dowfax 2A1 anionic surfactant. The grafting reaction was carried out with essentially no coagulum and/or plate out during the grafting process showing that the large agglomerated rubber particles of about 0.5 microns can be grafted as a stable latex in the presence of oligomeric surfactants as the essentially sole emulsifying agent to provide stable grafted large rubber particle latices.

EXAMPLE THREE-EIGHT

Example Two was repeated using varying amounts of the oligomeric surfactant used in Example Two. The surfactant was evaluated at 0.05, 1.0, 2.0, 4.0, 7.0 and 15.0 parts per 100 parts of rubber solids and monomers added to the latex. Stable latices of grafted large rubber particles were obtained free of coagulum. ABS polyblends were recovered from the latices which had high toughness and gloss being free of coagulum hard spots providing great utility.

The anionic oligomeric polymeric polymers generally have multifunctional carboxyl groups in the molecule, hence, are water soluble yet have the hydrocarbon chain balance to provide an anionic surfactant function in the alkaline metal salt forms.

The polyvinyl acrylic acid type oligomeric anionic polymers are preferred and are commercially available from Uniroyal Inc., Naugatuck, Conn. under the trade names of Polywet KX-3, KX-4, ND-1, ND-2 in the sodium and potassium salt form having different molecular weights. Such polyfunctonal carboxylic oligomeric surfactants are also available from the Rohm and Haas Co., Philadelphia, Pa. under the tradename of Tamol 731 and 850 being the sodium salts of an oligomeric polymeric carboxylic acid and having anionic surfactant properties.

What is claimed is:

1. A process for preparing ABS polyblends by grafting large diene rubber particles with alkenyl aromatic and alkenyl nitrile monomers comprising:
   A. charging an aqueous latex containing diene rubber solids to a mixing zone, said rubber being dispersed in said latex by an anionic surfactant as particles having an average particle size diameter of about 0.05 to 0.20 microns,
   B. mixing a water soluble organic acid anhydride having an ionization constant higher than that of the acid member of the anionic surfactant in said aqueous latex,
   C. agglomerating said rubber particles, contained in said latex, to larger agglomerated particles having an average particle size of about 0.30 to 1.0 microns,
   D. stabilizing said larger agglomerated rubber particles in said latex by the addition of a sufficient amount of an alkali metal salt of a polyfunctional carboxylic oligomeric surfactant to said latex to stabilize said latex,
   E. polymerizing a mixture of alkenyl aromatic and alkenyl nitrile monomers in the presence of said stabilized latex so as to form a matrix phase polymer of said monomers and graft said agglomerated rubber particles with at least a portion of said monomers, providing a latex containing said grafted rubber particles and said matrix polymer essentially free of coagulum, and
   F. separating said matrix polymers having said grafted diene rubber particle dispersed therein from said latex as an ABS polyblend.

2. A process of claim 1, wherein said organic acid anhydride is acetic anhydride, maleic anhydride, or propionic anhydride.

3. A process of claim 2 wherein said organic acid anhydride is acetic anhydride.

4. A process of claim 1, wherein said organic acid anhydride is mixed into said latex in an stoichiometric amount equivalent to at least about one-tenth of the stoichiometric amount of said anionic surfactant contained in said latex.

5. A process of claim 4, wherein the stoichiometric amount of said organic acid anhydride used in one-tenth to five times the stoichiometric amount said anionic surfactant in said latex.

6. A process of claim 1, wherein said monomers are styrene and acrylonitrile.

7. A process of claim 6, wherein said styrene and acrylonitrile are copolymerized in a weight ratio of 85:15 to 60:40.

8. A process of claim 1, wherein said agglomerated rubber particles are grafted with said monomers in a weight with said monomers in a weight ratio of grafted monomers to rubber of about 0.1 to 1 to 2:1.

9. A process of claim 1, wherein said anionic surfactant is an alkali metal fatty acid soap.

10. A process of claim 9, wherein said soap is a sodium soap of oleic, palmitic or stearic acids and mixtures thereof.

11. A process of claim 7, wherein said anionic surfactant is an alkali metal salt of an alkyl or alkenyl sulfate or sulfonate or mixtures thereof.

12. A process of claim 1, wherein said anionic oligomer is comprised of monomers selected from the group consisting of acrylic acid, methacrylic acid, ethacrylic acid, maleic anhydride and copolymers thereof with styrene, acrylonitrile, acrylamides, vinyl ethers and vinyl esters or mixtures thereof.

13. A process of claim 12, wherein said anionic oligomer has a degree of polymerization of at least about 5 monomer units per molecule with about 5 to 100% of said monomer units having functional carboxyl groups.

14. A process of claim 13, wherein the degree of polymerization of said oligomer is about 5 to 200.

15. A process of claim 1, wherein said oligomeric surfactant is an oligomer of acrylic or methacrylic acid.

16. A process of claim 1, wherein said oligomeric surfactant is an oligomer of a salt of acrylic or methacrylic acid.

17. A process of claim 1, wherein said oligomeric surfactant is an oligomer of acrylic acid and acrylamide monomers.

18. A process of claim 1, wherein said oligomeric surfactant is present in step (D) in an amount of about 0.05 to 15 parts per 100 parts of the rubber solids and monomer contained in the latex as polymerized in step (E).

* * * * *